US011689488B2

(12) United States Patent
Tan et al.

(10) Patent No.: US 11,689,488 B2
(45) Date of Patent: *Jun. 27, 2023

(54) DETERMINATION OF CONVERSATION THREADS IN A MESSAGE CHANNEL BASED ON CONVERSATIONAL FLOW AND SEMANTIC SIMILARITY OF MESSAGES

(71) Applicant: INTERNATIONAL BUSINESS MACHINES CORPORATION, Armonk, NY (US)

(72) Inventors: Ming Tan, Malden, MA (US); Haoyu Wang, Somerville, MA (US); Dakuo Wang, Cambridge, MA (US); Chuang Gan, Cambridge, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 16 days.

This patent is subject to a terminal disclaimer.

(21) Appl. No.: 17/313,995

(22) Filed: May 6, 2021

(65) Prior Publication Data
US 2021/0266282 A1 Aug. 26, 2021

Related U.S. Application Data

(63) Continuation of application No. 16/551,321, filed on Aug. 26, 2019, now Pat. No. 11,057,330.

(51) Int. Cl.
*H04L 51/216* (2022.01)
*G06F 40/30* (2020.01)
*H04L 51/42* (2022.01)
*G06F 40/35* (2020.01)

(52) U.S. Cl.
CPC ............ *H04L 51/216* (2022.05); *G06F 40/30* (2020.01); *G06F 40/35* (2020.01); *H04L 51/42* (2022.05)

(58) Field of Classification Search
CPC ....... G06F 40/30; G06F 40/35; H04L 51/216; H04L 51/42
See application file for complete search history.

(56) References Cited

U.S. PATENT DOCUMENTS

| | | | |
|---|---|---|---|
| 8,725,717 | B2 | 5/2014 | Bernstein et al. |
| 9,047,274 | B2 | 6/2015 | Venkatapathy et al. |
| 9,705,832 | B2 | 7/2017 | Waltermann et al. |
| 10,346,166 | B2 | 7/2019 | Chen et al. |
| 10,348,658 | B2 | 7/2019 | Rodriguez et al. |

(Continued)

OTHER PUBLICATIONS

"Dynamic Context Aware Chatbot Interaction Mechanism", IP.com, Anonymously disclosed, IP.com No. IPCOM000258976D, Jun. 29, 2019, pp. 6.

(Continued)

*Primary Examiner* — Thomas J Dailey
(74) *Attorney, Agent, or Firm* — Konrad Raynes Davda & Victor LLP; Rabindranath Dutta

(57) ABSTRACT

A deep learning module classifies messages received from a plurality of entities into one or more conversation threads. In response to receiving a subsequent message, the deep learning module determines which of the one or more conversation threads and a new conversation thread is contextually a best fit for the subsequent message. The subsequent message is added to the determined conversation thread.

14 Claims, 11 Drawing Sheets

(56) References Cited

U.S. PATENT DOCUMENTS

| | | | |
|---|---|---|---|
| 2010/0064017 A1* | 3/2010 | Buchheit | H04L 51/216 709/206 |
| 2013/0273976 A1 | 10/2013 | Rao et al. | |
| 2013/0318172 A1 | 11/2013 | Liberty et al. | |
| 2014/0245178 A1 | 8/2014 | Smith | |
| 2014/0310365 A1 | 10/2014 | Sample et al. | |
| 2015/0244657 A1 | 8/2015 | Ghafourifar et al. | |
| 2017/0270929 A1 | 9/2017 | Aleksic et al. | |

OTHER PUBLICATIONS

D. Feng, et al., "Learning to Detect Conversation Focus", Information Sciences Institute, University of Southern California, 2017, pp. 8.

"In Context Experts From The Active Communication Threads", IP.com, Anonymously disclosed, IP.com No. IPCOM000246606D, Jun. 20, 2016, pp. 4.

S. Mehri, et al., "Chat Disentanglement Identifying Semantic Reply", Proceedings of the The 8th International Joint Conference on Natural Language Processing, 2017, pp. 615-623.

"Method and System for Providing Semi Automated Social Instructions", IP.com, Anonymously disclosed, IP.com No. IPCOM000255716D, Oct. 11, 2018, pp. 3.

J. Allan, "Introduction to Topic Detection and Tracking", Topic Detection and Tracking, 2002, pp. 19.

B. Butler, et al., "Community Effort in Online Groups: Who Does the Work and Why", 2002, pp. 32.

D. Cer, et al., "Universal Sentence Encoder", 2018, pp. 7.

W., Du, et al., "Discovering Conversational Dependencies between Messages in Dialogs", Proceedings of the Thirty-First AAAI Conference on Artificial Intelligence (AAAI-17), 2017, pp. 2.

M. Elsner, et al., "You talking to me A Corpus and Algorithm for Conversation Disentanglement", Proceedings of 46th Annual Meeting of the Association for Computational Linguistics, pp. 834 842, Jun. 2008.

M. Elsner, et al., "Disentangling Chat", Association for Computational Linguistics, 2010, pp. 23.

M. Elsner, et al., "Disentangling Chat with Local Coherence Models", Proceedings of the 49th Annual Meeting of the Association for Computational Linguistics, pp. 1179-1189, Jun. 19-24, 2011.

T. Erickson, "Making Sense of Computer-Mediated Communication (CMC): Conversations as Genres, CMC Systems as Genre Ecologies", Proceedings of the 33rd Hawaii International Conference on System Sciences, IEEE, 2000, pp. 11.

J. Jiang, et al., "Learning to Disentangle Interleaved Conversational Threads with a Siamese Hierarchical Network and Similarity Ranking", Proceedings of 2018 Conference of the North American Chapter of the Association for Computational Linguistics 2018, pp. 1812-1822, 2018.

D.P. Kingma, et al., "Adam: A Method for Stochastic Optimization", Proceedings of the 3rd International Conference on Learning Representations. 2015, pp. 15.

E. Mayfield, et al., "Hierarchical Conversation Structure Prediction in Multi-Party Chat", Proceedings of the 13th Annual Meeting of the Special Interest Group on Discourse and Dialogue (SIGDIAL), pp. 60-69, 2012.

K.M. Hermann et al., "Teaching Machines to Read and Comprehend", 2015, pp. 9.

A. Shamekhi, et al., "Face Value Exploring the Effects of Embodiment for a Group Facilitation Agent", Proceedings of the 2018 CHI Conference on Human Factors in Computing Systems, ACN, pp. 13.

D. Shen, et al., "Thread Detection in Dynamic Text Message Streams", SIGIR"06, Aug. 6-11, 2006, Seattle, Washington, USA. 2006 ACM, pp. 8.

M. Tan, et al., "Improved Representation Learning for Question Answer Matching", Proceedings of the 54th Annual Meeting of the Association for Computational Linguistics, pp. 464-473, Berlin, Germany, Aug. 7-12, 2016, pp. 10.

L. Wang, et al., "Context-based Message Expansion for Disentanglement of Interleaved Text Conversations", Human Language Technologies: The 2009 Annual Conference of the North American Chapter of the ACL, pp. 200-208, Boulder, Colorado, Jun. 2009.

A.Zhang, et al., "Characterizing online discussion using coarse discourse sequences", 11th AAAI International Conference on Web and Social Media (ICWSM), 2017, pp. 10.

A. Zhang, et al., "Making Sense of Group Chat through Collaborative Tagging and Summarization", Proceedings of the ACM on Human-Computer Interaction, vol. 2, No. CSCW, Article 196. Publication date: Nov. 2018, pp. 27.

F. Khan, et al., Mining Chat-room Conversations for Social and Semantic Interactions, Computer Science and Engineering, Lehigh University, 2002, pp. 12.

U.S. Appl. No. 16/551,321, filed Jun. 26, 2019.

Office Action dated Oct. 20, 2020, pp. 26, for U.S. Appl. No. 16/551,321.

Response dated Jan. 4, 2021, pp. 11, to Office Action dated Oct. 20, 2020, pp. 26, for U.S. Appl. No. 16/551,321.

Notice of Allowance dated Mar. 3, 2017, pp. 8, for U.S. Appl. No. 16/551,321.

List of IBM Patents and Applications Treated as Related, May 6, 2021, pp. 2.

\* cited by examiner

Example of a conversation in a multi-party conversation system and classification of messages of the conversation into conversation threads

| Message ID | User | Message | Timestamp | Thread ID (Determined by deep learning module) |
|---|---|---|---|---|
| 0 | Adam | Hi, who is living in the Boston area? | 10:10 PM | 0 |
| 1 | Bob | Anyone watched the Super Bowl last night? | 10:11 PM | 1 |
| 2 | Chris | I lived in Cambridge. | 10:12 PM | 0 |
| 3 | Adam | Hi Chris can you recommend a pizza restaurant? | 10:15 PM | 0 |
| 4 | Chris | Bob, I watched it. | 10:18 PM | 1 |
| 5 | Adam | Me too. | 10:20 PM | 1 |

FIG. 2

DETERMINATION OF CONVERSATION THREADS IN A MESSAGE CHANNEL BASED ON CONVERSATIONAL FLOW AND SEMANTIC SIMILARITY OF MESSAGES

CROSS-REFERENCE TO RELATED APPLICATION

This application is a continuation of U.S. patent application Ser. No. 16/551,321, filed Aug. 26, 2019, which application is incorporated herein by reference in its entirety.

BACKGROUND

1. Field

Embodiments relate to the determination of conversation threads in a message channel based on conversational flow and semantic similarity of messages.

2. Background

One of the artificial intelligence (AI) techniques used for processing big data is machine learning. Machine learning may use a self-adaptive algorithm that generates increasingly better analysis and patterns based on experience or with newly added data. Deep learning is a type of machine learning in which a hierarchical level of artificial neural networks may be used to perform the process of machine learning. An artificial neural network may be trained to perform operations with a training set of data, and as additional new data is processed the neural network may improve its performance.

Natural language processing (NLP) is a subfield of linguistics, computer science, information engineering, and artificial intelligence concerned with interactions between computers and human (natural) languages. NLP allows the programming of computers to process and analyze large amounts of natural language data. NLP techniques may comprise syntax analysis, semantic analysis, and pragmatic analysis for analyzing natural language data.

Long short-term memory (LSTM) is an artificial recurrent neural network (RNN) architecture used in the field of deep learning. Unlike feed forward neural networks, LSTM has feedback connections. LTSM may not only process single data points, but also entire sequences of data such as those found in natural language, speech or video. LSTM networks are well-suited to classifying, processing and making predictions based on time series data, since there may be lags of unknown duration between important events in a time series.

A greedy search mechanism is a search mechanism that uses heuristic for making locally optimal choices at each stage with the hope of finding a global optimum. In greedy search whatever choice seems best at the moment is selected and then the sub-problems that arise are solved later. Greedy search mechanisms may be applied to learning techniques.

SUMMARY OF THE PREFERRED EMBODIMENTS

Provided are a method, a system, a computer program product in which a deep learning module classifies messages received from a plurality of entities into one or more conversation threads. In response to receiving a subsequent message, the deep learning module determines which of the one or more conversation threads and a new conversation thread is contextually a best fit for the subsequent message. The subsequent message is added to the determined conversation thread.

In certain embodiments, the deep learning module determines the best fit for the subsequent message by utilizing a flow model in which the subsequent message is added to a conversation thread with which the subsequent message forms a more fluent conversation in comparison to other conversation threads.

In additional embodiments, the deep learning module determines the best fit for the subsequent message by utilizing a semantic match model in which the subsequent message is added to a conversation thread with which the subsequent message is semantically closer in comparison to other conversation threads.

In further embodiments, the deep learning module determines the best fit for the subsequent message by combining a flow fit measure from a flow model and a semantic match measure from a semantic match model.

In yet further embodiments, for each conversation thread, the flow model determines the flow fit measure of the subsequent message, wherein the flow fit measure represents a fluency of conversation in the conversation thread if the subsequent message is added to the conversation thread. Additionally, for each conversation thread, the semantic match model determines the semantic match measure of the subsequent message, wherein the semantic match measure represents a semantic closeness of conversation in the conversation thread if the subsequent message is added to the conversation thread.

In yet further embodiments, a determination is made of a flow fit and semantic match combination measure for each conversation thread from the flow fit measure and the semantic match measure of the conversation threads. The subsequent message is classified into a conversation thread that has a best flow fit and semantic match combination measure in comparison to other conversation threads.

In yet further embodiments, potential conversation threads for adding a new message are pruned by using a greedy search mechanism in which low likelihood conversation threads for adding the new message are discarded based on computed measures that include measures for semantic closeness, measures for fluency of conversation in a conversation thread, and elapsed times of messages.

BRIEF DESCRIPTION OF THE DRAWINGS

Referring now to the drawings in which like reference numbers represent corresponding parts throughout:

FIG. 2 illustrates a block diagram that shows an example of a conversation in a multi-party conversation system and classification of messages of the conversation into conversation threads, in accordance with certain embodiments;

DETAILED DESCRIPTION

In the following description, reference is made to the accompanying drawings which form a part hereof and which illustrate several embodiments. It is understood that other embodiments may be utilized and structural and operational changes may be made.

In multi-party chat conversations, multiple topics are often discussed at the same time. For example, a first individual may exchange messages about the topic of work with a second individual while simultaneously exchanging messages about the topic of lunch with a third individual, and this may result in intermingled messages on both the topic of work and the topic of lunch in a multi-party chat system that displays both sets of messages as they are sent and received in a chronological order.

In certain situation, automatic conversational thread detection may be used to disentangle and group the messages into their respective topic threads. Such conversational thread disentanglement may be based on pairwise message comparison in which context from other messages may be ignored.

Certain embodiments provide a deep learning module based on models that consider the interactions between multiple messages and the semantic similarity between a message with the long-span history of messages prior to the message. Certain embodiments use a flow model in which a new message is added to a conversation thread with which the new message forms a more fluent conversation in comparison to other conversation threads. Certain embodiments use a semantic match model in which the new message is added to a conversation thread with which the new message is semantically closer in comparison to other conversation threads. Certain other embodiments combine measures from both the flow model and the semantic match model. As a result, such embodiments consider contextual information in the process of detection of conversation threads, and the conversation thread information from such embodiments may be used to improve response relevancy for conversational agents or to improve the quality of chat summarization to improve the functionality of a computing system.

Exemplary Embodiments

Figure 1:
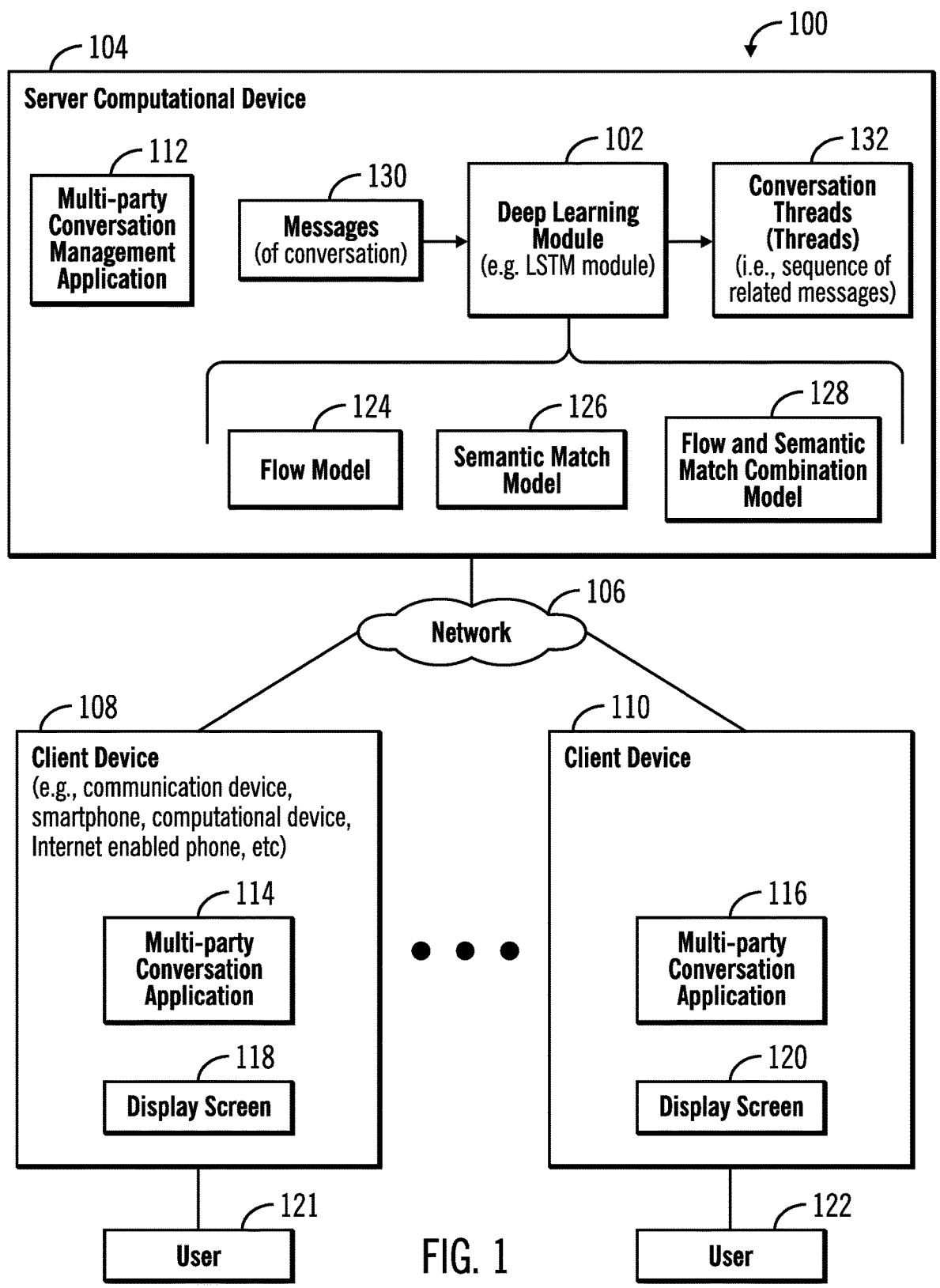
FIG. 1 illustrates a block diagram of a computing environment for classifying messages of a multi-party conversation system into conversation threads via a deep learning module, where the computing environment includes a server computational device coupled over a network to a plurality of client devices, in accordance with certain embodiments.

FIG. 1 illustrates a block diagram of a computing environment 100 for classifying messages of a multi-party conversation system into conversation threads via a deep learning module 102, where the computing environment 100 includes a server computational device 104 coupled over a network to a plurality of client devices 108, 110, in accordance with certain embodiments.

The server computational device 104 may comprise any suitable computational device including those presently known in the art, such as, a personal computer, a workstation, a server, a mainframe, a hand held computer, a palm top computer, a telephony device, a network appliance, a blade computer, a processing device, a controller, etc. The network 106 may comprises any suitable network, such as, a wide area network, a wireless network, the Internet, an intranet, a local area network. The client devices 108, 110 may comprise any suitable communication device, such as a smartphone, a computational device, an Internet-enabled phone, a landline phone, etc. In certain embodiments, the server computational device 104 and the client devices 108, 110 may be elements in a cloud computing environment.

The server computational device 104 may include a multi-party conversation management application 112 and the deep learning module 102 that communicate with each other. In certain embodiments, the multi-party conversation management application 112 and the deep learning module 102 may be implemented in software, hardware, firmware or any combination thereof. The multi-party conversation management application 112 may provide services for a multi-party conversation application 114, 116 accessed by the plurality of client devices 108, 110. The deep learning module 102 may provide learning mechanisms and may be based on various types of artificial intelligence based platforms, such as IBM WATSON*. In certain embodiments the deep learning module 102 may comprise a long short-term memory (LSTM) module that is suited for classifying, processing and making predictions based on time series data.

* IBM, IBM WATSON, ZSERIES, PSERIES, XSERIES, BLADECENTER, WEBSPHERE, and DB2 are trademarks or registered trademarks of International Business Machines Corporation registered in many jurisdictions worldwide.

The client device 108 may include the multi-party conversation application 114 that may display intermingled messages from multiple users on a display screen 118 to a user 121. The client device 110 may include the multi-party conversation application 116 that may display intermingled messages from multiple users on a display screen 120 to a user 122.

In certain embodiments the deep learning module 102 may be implemented by using a flow model 124, a semantic match model 126, and/or a flow and semantic match combination model 128. The deep learning module 102 may receive messages 130 of multi-party conversation from the multi-party conversation application 112 as the messages arrive, or from a previously captured message log. The deep learning module 102 generates conversation threads 132 from the messages 130, where each conversation thread is a sequence of related messages that in certain embodiments pertain to the same topic.

FIG. 2 illustrates a block diagram 200 that shows an example of a conversation in a multi-party conversation system and the classification of messages of the conversation into conversation threads, in accordance with certain embodiments. The elements associated with a message may include a message identifier (Message ID 202), the identification of the user 204 who sends a message 206, and a timestamp 208 of the message. For example, a message identified with message identifier "0" may be sent by the user "Adam" with the message text of "Hi, who is living in the Boston area?" with a timestamp of 10:10 PM as shown in FIG. 2.

The 6 messages shown in FIG. 2 may be classified into two conversation threads by the deep learning module 102. The column labeled Thread ID 210 denotes the conversation thread to which a message is classified into. For example, messages with message IDs 0, 2, 3 have been classified into a conversation thread with ThreadID 0, and messages with message IDs 1, 4, 5 have been classified into a conversation thread with ThreadID 1. The conversation thread with ThreadID 0 pertain to the topic of living in the Boston area, whereas the conversation thread with ThreadID 1 pertain to the topic of watching the Super Bowl.

Figure 3:
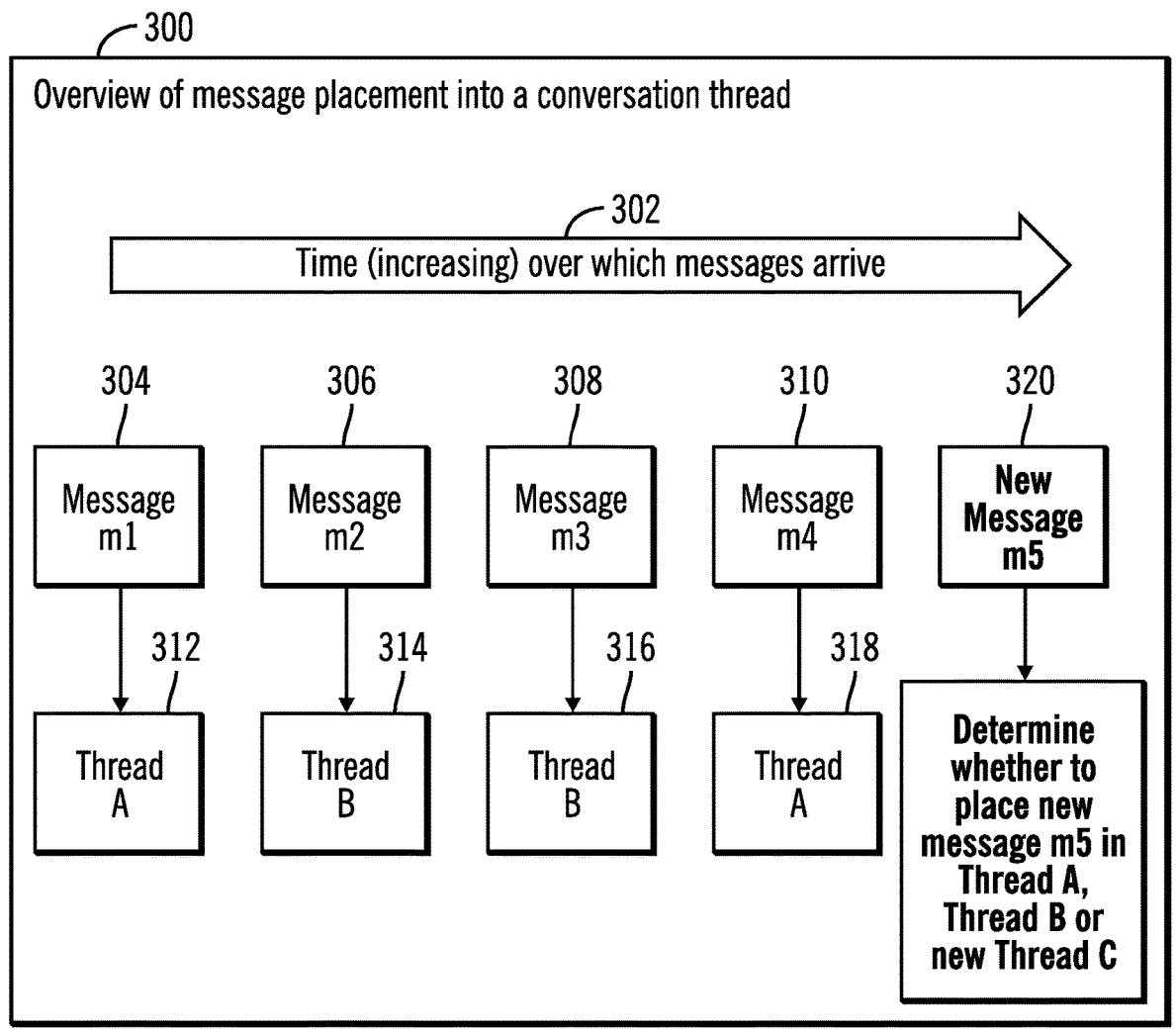
FIG. 3 illustrates a block diagram that shows an overview of message placement into a conversation thread, in accordance with certain embodiments.

FIG. 3 illustrates a block diagram 300 that shows an overview of message placement into a conversation thread, in accordance with certain embodiments. The arrow 302 shows the passage of time as messages for a multi-party conversation arrive.

In certain embodiments, the deep learning module 102 has already classified sequentially arriving messages m1, m2, m3, m4 (shown via reference numerals 304, 306, 308, 310) into either thread A or thread B (shown via reference numerals 312, 314, 316, 318), where thread A and thread B are conversation threads (conversation threads may also be referred to as threads for the purposes of this disclosure).

A new message m5 320 arrives after the last message m4, and the deep learning module 102 determines whether to place the new message m5 320 in conversation thread A or conversation thread B or start a new conversation thread C. The deep learning module 102 performs the placement of the new message m5 320 into a conversation thread based on determining which of these three conversation threads A, B, C is contextually a best fit for the new message m5 320, the best fit being determined by measures computed by the flow model 124, the semantic match model 126 and/or the flow and semantic match combination model 128.

Figure 4:
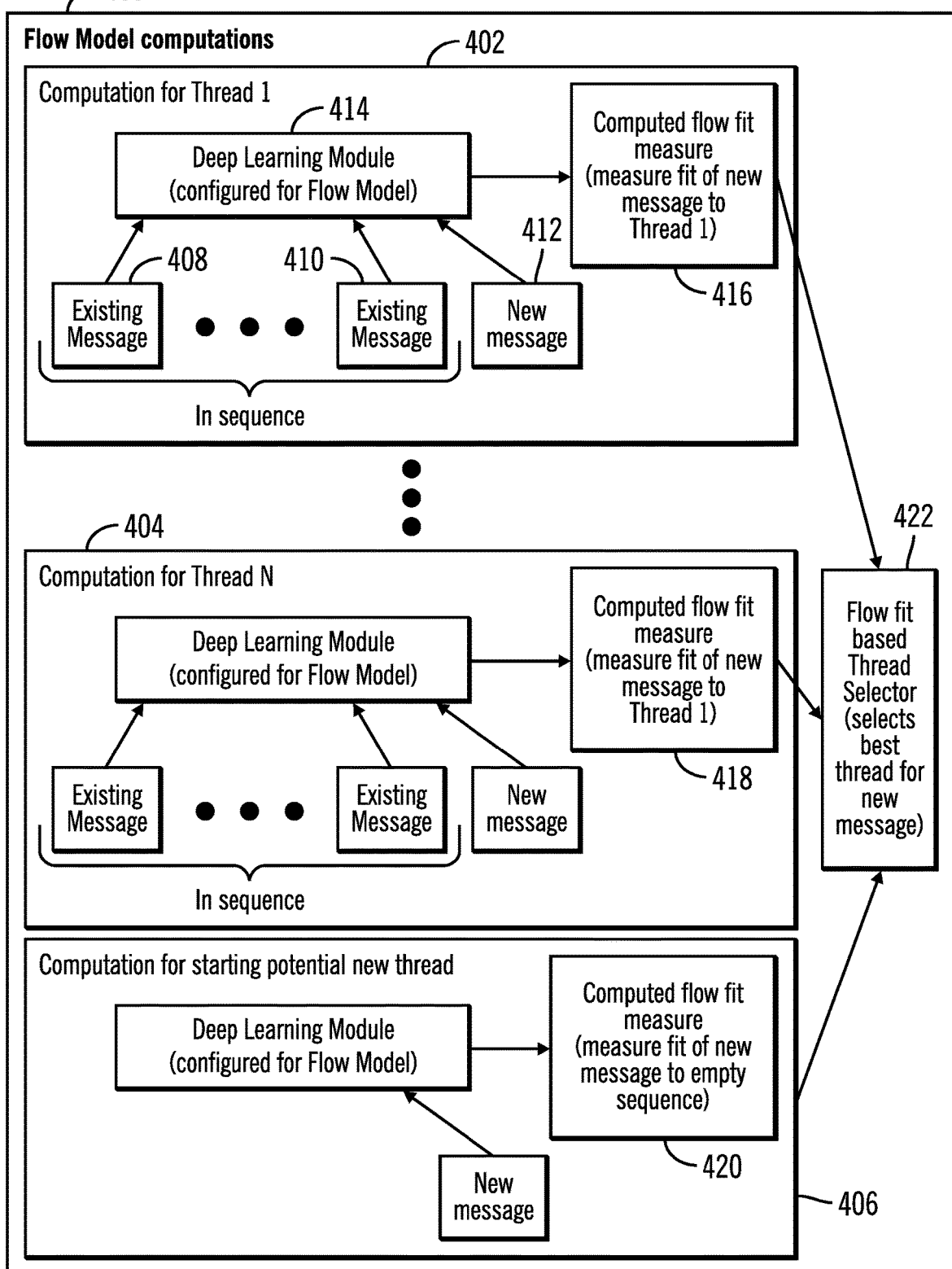
FIG. 4 illustrates a block diagram that shows computations performed via a flow model implemented in the deep learning module, in accordance with certain embodiments.

FIG. 4 illustrates a block diagram 400 that shows computations performed via a flow model 124 implemented in the deep learning module 102, in accordance with certain embodiments.

The computations performed for a plurality of existing threads are shown via reference numerals 402, 404. The computations performed for starting a potential new thread are shown via reference numeral 406.

For thread 1, the existing messages 408, 410 are in a sequence when a new message 412 is considered for adding to thread 1 by the deep learning module 414 (which is same as deep learning module 102). The deep learning module 414 computes a flow fit measure 416 which a measure of the fit of the new message 412 to thread 1. This flow model considers each thread as a conversation flow for a particular topic with its own genre, and the new message should belong to the thread with which it is more likely to form a fluent conversation. The measure of the fit of the new message to a thread denotes the extent of the conversation flow when the new message is added to the thread. Similar computations are performed by the deep learning module for starting a new thread (as shown via reference numeral 406) except that the new message is added to an empty thread and a flow fit measure 420 is computed.

In FIG. 4, for all existing threads, the flow fit measure is computed (as shown via reference numerals 416, 418) with the new message added to each existing thread.

Once the flow fit measures 416, 418, 420 are computed by the deep learning module, then a flow fit based thread selector 422 selects the best thread for the new message by determining which of the computed flow fit measures 416, 418, 420 is best. The flow fit measures may comprise a numerical value, a qualitative assessment, a mathematical expression denoted by vectors, matrices, or some other notation, a probability or conditional probability based expression, etc. No matter what the representation of the flow fit measure, the flow fit based thread selector 422 determines the best thread to which the new message should be added based on comparing the flow fit measures. The functions for performing such operations are included in the deep learning module 102.

Figure 5:
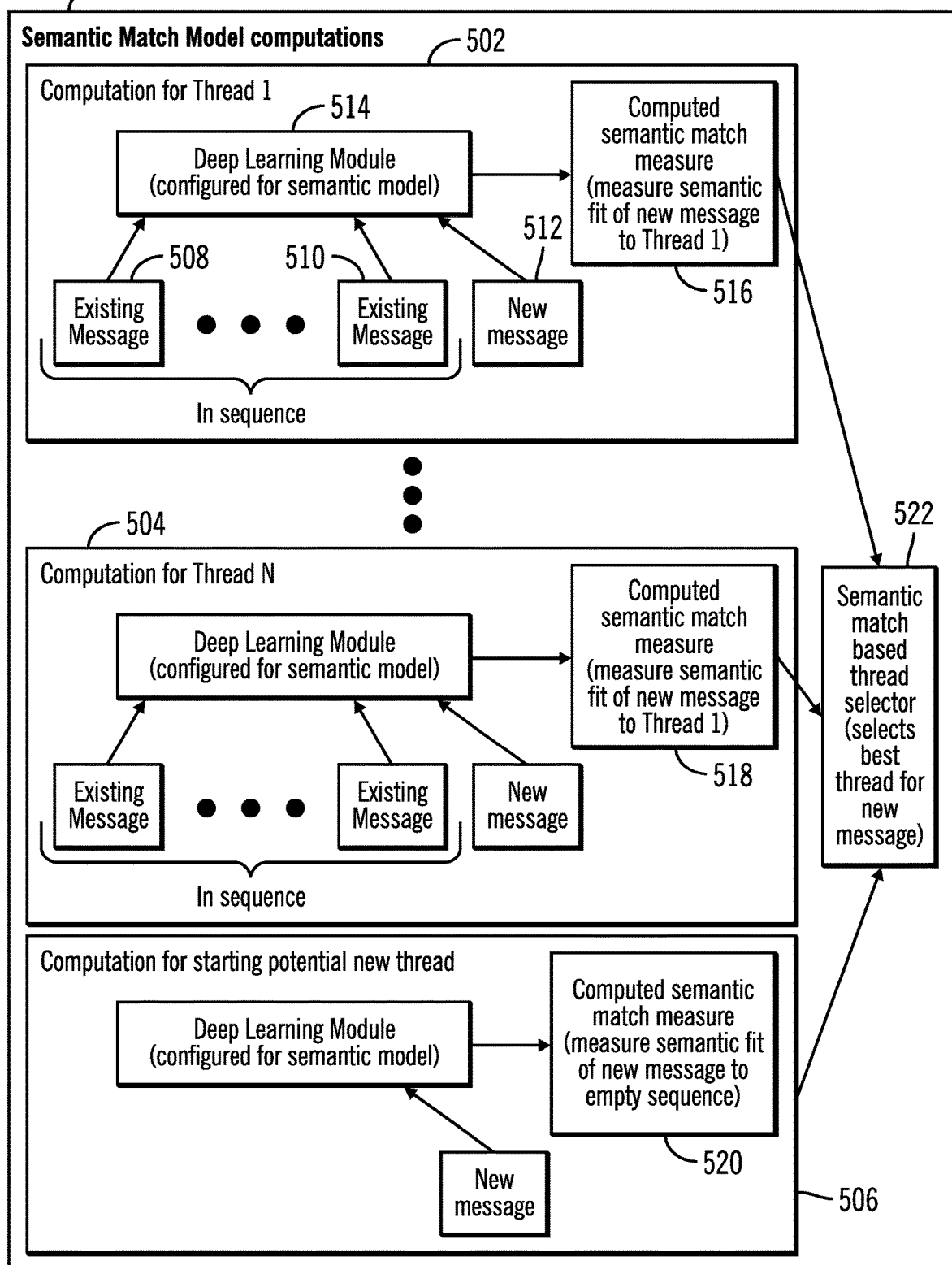
FIG. 5 illustrates a block diagram that shows computations performed via a semantic match model implemented in the deep learning module, in accordance with certain embodiments.

FIG. 5 illustrates a block diagram 500 that shows computations performed via a semantic match model 126 implemented in the deep learning module 102, in accordance with certain embodiments.

The computations performed for a plurality of existing threads are shown via reference numerals 502, 504. The computations performed for starting a potential new thread are shown via reference numeral 506.

For thread 1, the existing messages 508, 510 are in a sequence when a new message 512 is considered for adding to thread 1 by the deep learning module 514 (which is same as deep learning module 102). The deep learning module 514 computes a semantic match measure 516 which a measure of the semantic fit of the new message 512 to thread 1. This semantic match model considers the semantics of an existing thread, and the new message should belong to the thread with which it is likely to be semantically closest. The semantic match measure 516 denotes the extent of the semantic closeness when the new message is added to the thread. Similar computations are performed by the deep learning module for starting a new thread (as shown via reference numeral 506) except that the new message is added to an empty thread and a semantic match measure 520 is computed.

In FIG. 5, for all existing threads, the semantic match measure is computed (as shown via reference numerals 516, 518) with the new message added to each existing thread.

Once the semantic match measures 516, 518, 520 are computed by the deep learning module, then a semantic match based thread selector 522 selects the best thread for the new message by determining which of the computed semantic match measures 516, 518, 520 is best. The semantic match measures may comprise a numerical value, a qualitative assessment, a mathematical expression denoted by vectors, matrices, or some other notation, a probability or conditional probability based expression, etc. No matter what the representation of the semantic match measure, the semantic match based thread selector 522 determines the best thread to which the new message should be added based on comparing the semantic match measures. The functions for performing such operations are included in the deep learning module 102.

Figure 6:
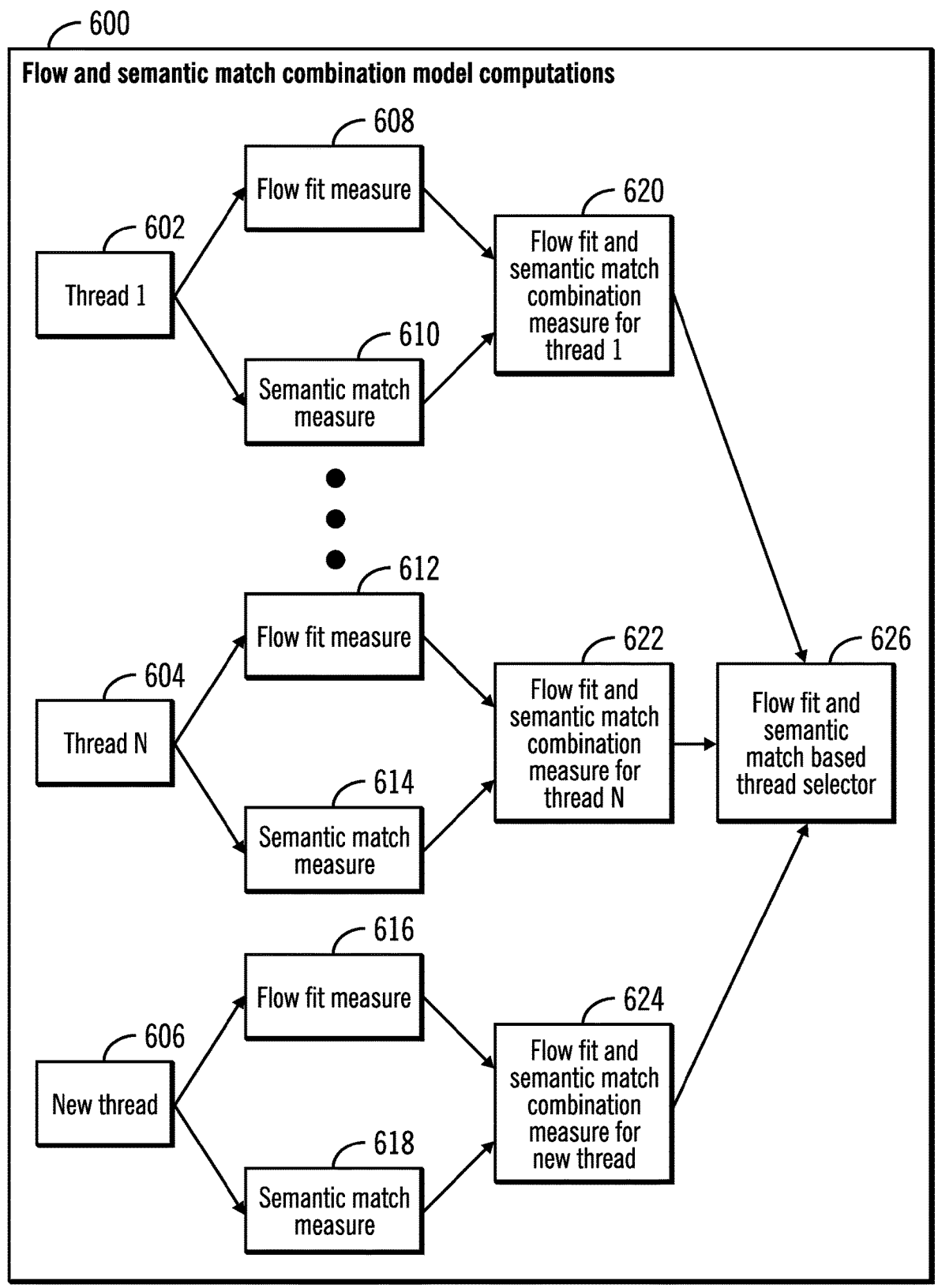
FIG. 6 illustrates a block diagram that shows computations performed via a flow and a semantic match combination model implemented in the deep learning module, in accordance with certain embodiments.

FIG. 6 illustrates a block diagram 600 that shows computations performed via a flow and a semantic match combination model 128 implemented in the deep learning module 102, in accordance with certain embodiments.

For each existing thread 602, 604, and the potential new thread 606, the flow fit measure and the semantic match measures are calculated for adding a new message (as shown via reference numerals 608, 610, 612, 614, 616, 618). For adding a new message to thread 1 602, a flow fit and semantic match combination measure 620 that is a function of the flow fit measure 608 and the semantic match measure 610 is calculated.

In FIG. 5, for all existing threads and the new thread, the flow fit and semantic match combination measure is computed (as shown via reference numerals 620, 622, 624) with the new message added to each existing thread.

Once the flow fit and semantic match combination measures 620, 622, 624 are computed by the deep learning module, then a flow fit and semantic match based thread selector 626 selects the best thread for the new message by determining which of the computed flow fit and semantic match combination measures 620, 622, 624 is best. The flow fit and semantic match combination match measures 620, 622, 624 may comprise a numerical value, a qualitative assessment, a mathematical expression denoted by vectors, matrices, or some other notation, a probability or conditional probability based expression, etc. No matter what the representation of the flow fit and semantic match combination measure, the flow fit and semantic match based thread selector 626 determines the best thread to which the new message should be added based on comparing the flow fit and semantic match combination measures. The functions for performing such operations are included in the deep learning module 102. The flow and semantic match combination model 128 may be regarded as a combination of the flow model 124 and the semantic match model 126 for the deep learning module 102.

Figure 7:
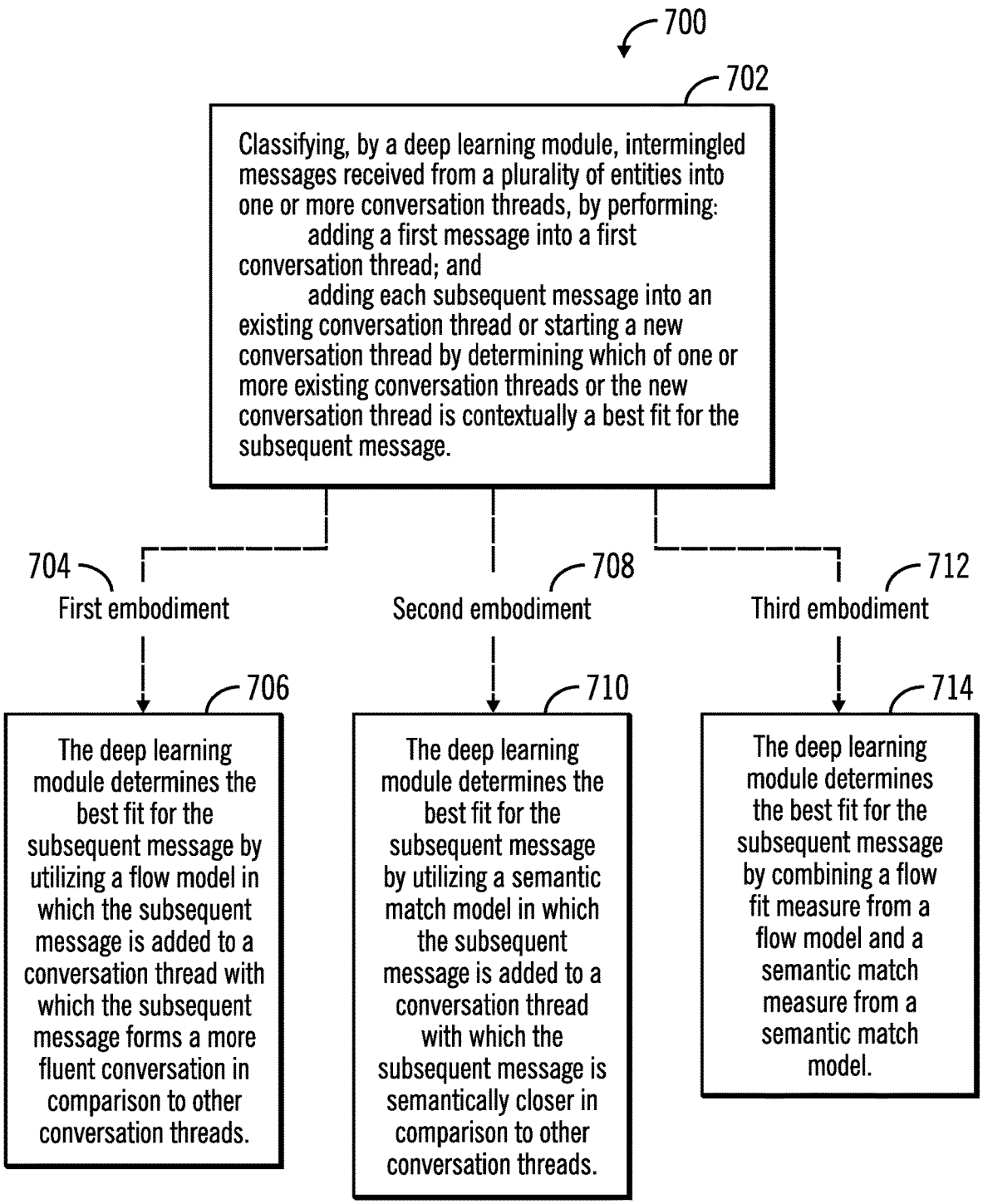
FIG. 7 illustrates a first flowchart that shows operations performed by the deep learning module for generating conversation threads from intermingled messages, in accordance with certain embodiments.

FIG. 7 illustrates a first flowchart 700 that shows operations performed by the deep learning module 102 for generating conversation threads from intermingled messages, in accordance with certain embodiments. In certain embodiments, the operations shown in FIG. 7 may be implemented in the deep learning module 102 that executes in the server computational device 104 or some other device.

Control starts at block 702 in which a deep learning module 102 classifies intermingled messages received from a plurality of entities (e.g., users 121, 122 or client devices 108, 110) into one or more conversation threads. To classify the intermingled messages, the deep learning module 102 adds a first message into a first conversation thread, and then adds each subsequent message into an existing conversation thread or starts a new conversation thread by determining which of one or more existing conversation threads or the new conversation thread is contextually a best fit for the subsequent message. A plurality of embodiments may be used to determine the best fit for the subsequent message.

In certain embodiments (e.g., first embodiment 704), the deep learning module 102 determines the best fit for the subsequent message by utilizing a flow model in which the subsequent message is added to a conversation thread with which the subsequent message forms a more fluent conversation in comparison to other conversation threads (as shown via reference numeral 706).

In additional embodiments (e.g., second embodiment 708), the deep learning module 102 determines the best fit for the subsequent message by utilizing a semantic match model in which the subsequent message is added to a conversation thread with which the subsequent message is semantically closer in comparison to other conversation threads (as shown via reference numeral 710).

In further embodiments (e.g., third embodiment 712), the deep learning module 102 determines the best fit for the subsequent message by combining a flow fit measure from a flow model and a semantic match measure from a semantic match model (as shown via reference numeral 714).

Figure 8:
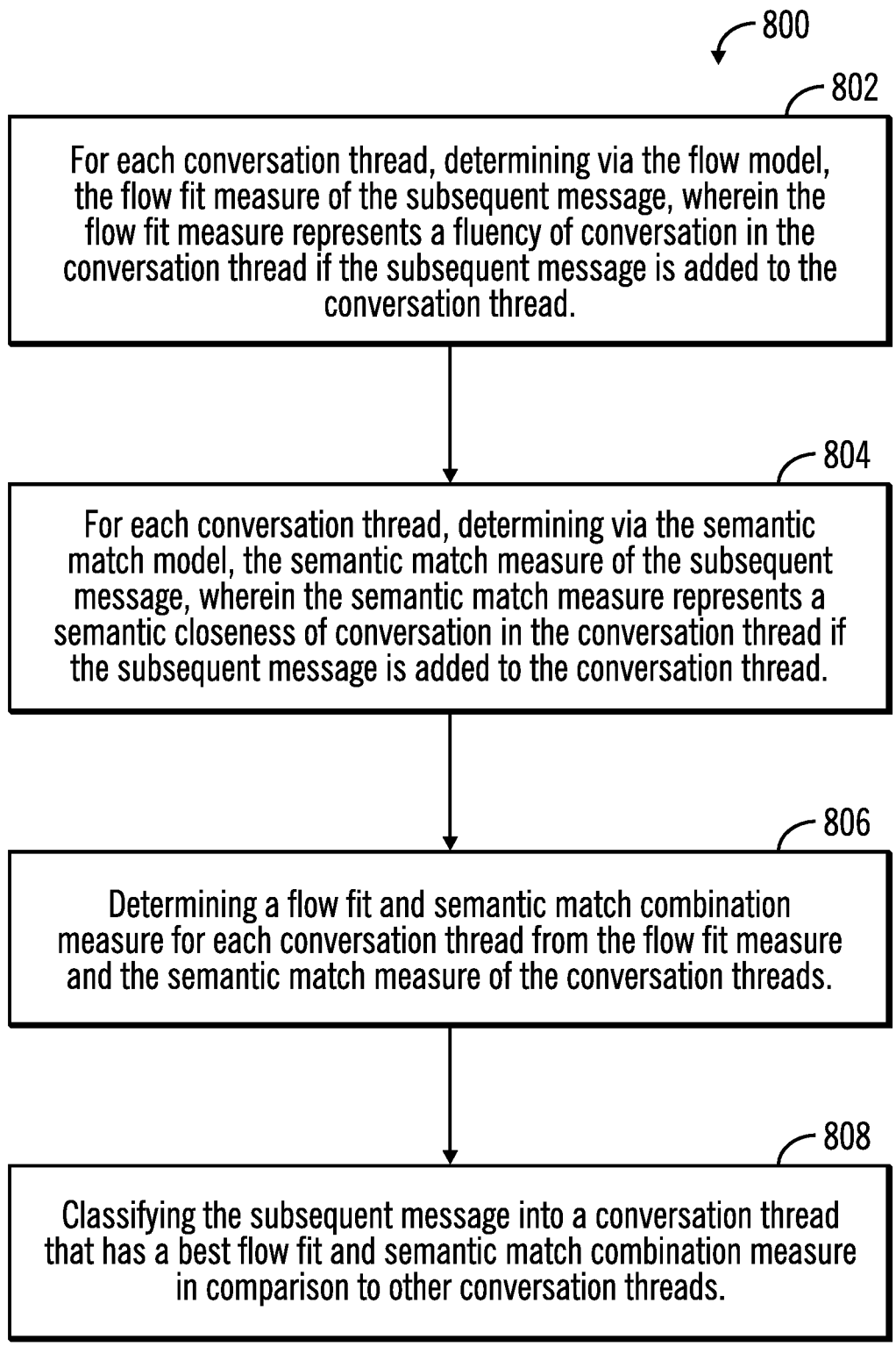
FIG. 8 illustrates a second flowchart that shows operations performed by the deep learning module for generating conversation threads from intermingled messages, in accordance with certain embodiments.

FIG. 8 illustrates a second flowchart 800 that shows operations performed by the deep learning module for generating conversation threads from intermingled messages, in accordance with certain embodiments. In certain embodiments, the operations shown in FIG. 8 may be implemented in the deep learning module 102 that executes in the server computational device 104 or some other device.

Control starts at block 802 in which for each conversation thread, the flow model 124 determines the flow fit measure of the subsequent message, wherein the flow fit measure represents a fluency of conversation in the conversation thread if the subsequent message is added to the conversation thread. Additionally, for each conversation thread, the semantic match model 126 determines (at block 804) the semantic match measure of the subsequent message, wherein the semantic match measure represents a semantic closeness of conversation in the conversation thread if the subsequent message is added to the conversation thread.

From block 804 control proceeds to block 806 in which a determination is made of a flow fit and semantic match combination measure for each conversation thread from the flow fit measure and the semantic match measure of the conversation threads. The subsequent message is classified (at block 808) into a conversation thread that has a best flow fit and semantic match combination measure in comparison to other conversation threads.

In yet further embodiments, potential conversation threads for adding a new message are pruned by using a greedy search mechanism in which low likelihood conversation threads for adding the new message are discarded based on computed measures that include measures for semantic closeness, measures for fluency of conversation in a conversation thread, and elapsed times of messages.

Therefore, FIGS. 1-8 illustrate certain embodiments in which a deep learning module classifies messages received from a plurality of entities into one or more conversation threads. In response to receiving a subsequent message, the deep learning module determining which of the one or more conversation threads and a new conversation thread is contextually a best fit for the subsequent message. The subsequent message is added to the determined conversation thread.

FIGS. 1-8 also illustrate certain embodiments for determining conversational threads in intermingled messages for a multi-party conversation system by using flow models, semantic match models, and flow and semantic match combination models in a deep learning mechanism employed on a server computational device 104. In certain embodiments in which the client devices 108, 110 conduct a multi-party conversation in a peer to peer system, the deep learning mechanism may be implemented in one or more of the client devices 108, 110.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 9:
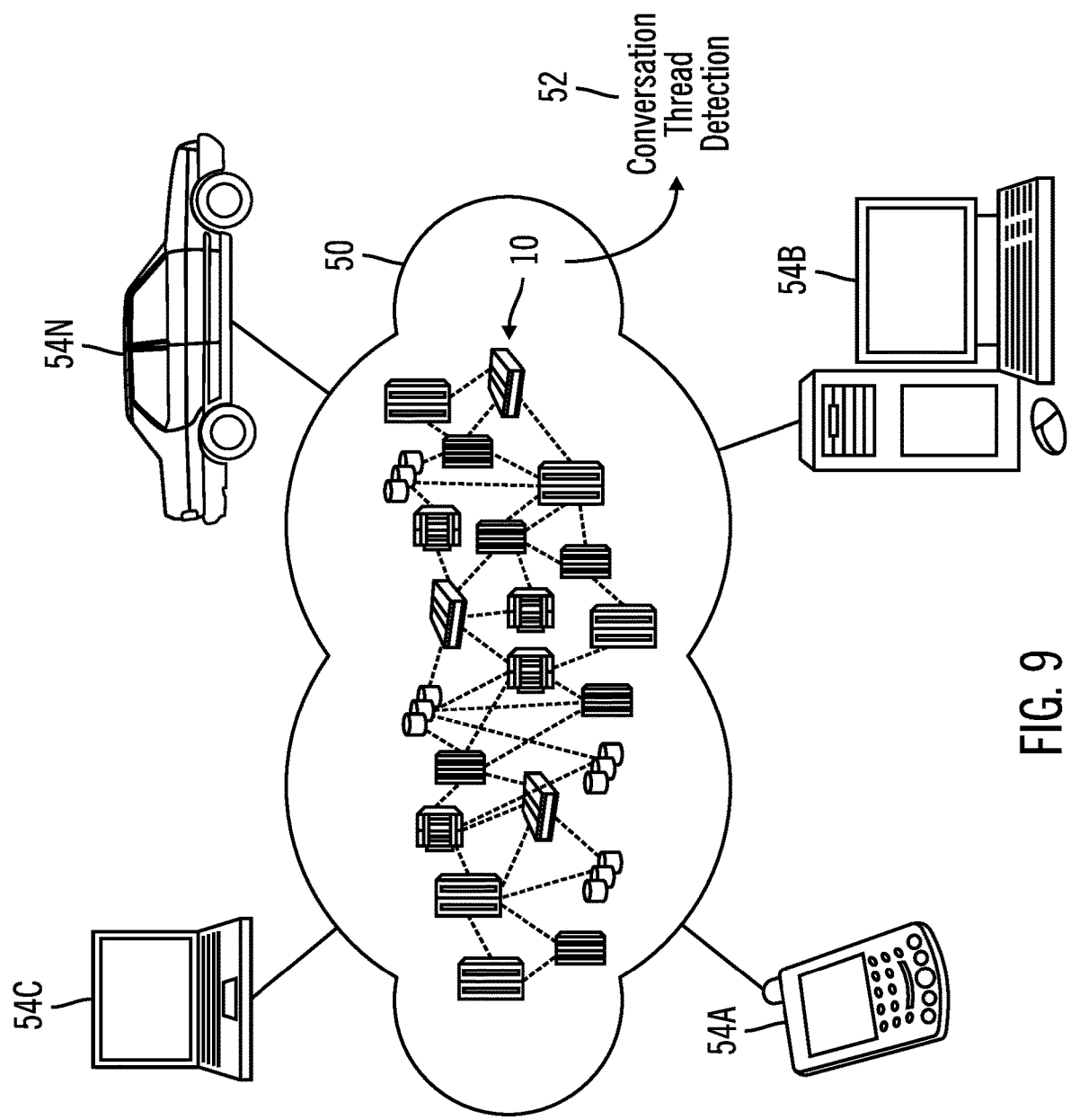
FIG. 9 illustrates a block diagram of a cloud computing environment, in accordance with certain embodiments.

Referring now to FIG. 9 an illustrative cloud computing environment 50 is depicted. Conversation thread detection (shown via reference numeral 52) is performed in the cloud computing environment 50. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
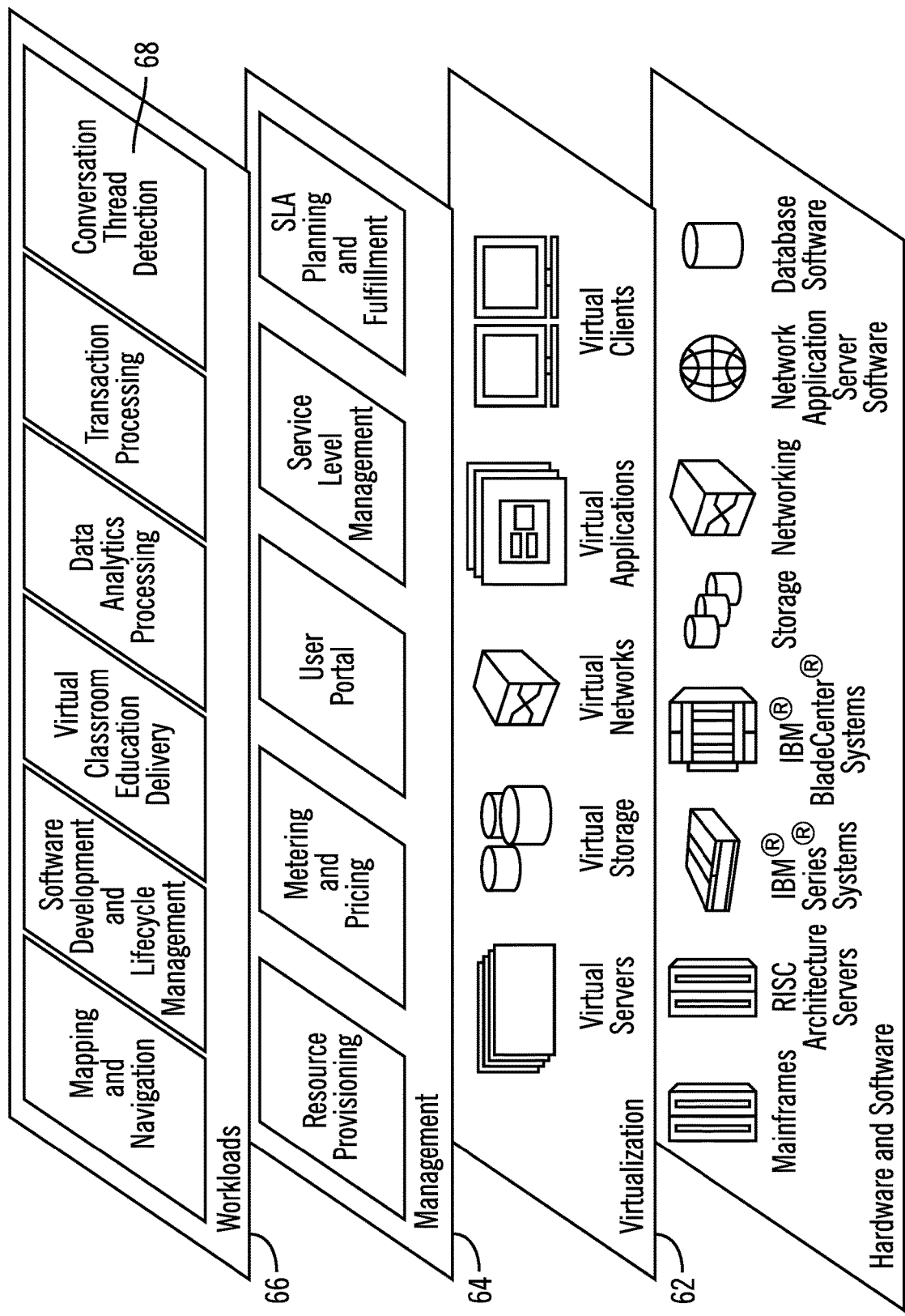
FIG. 10 illustrates a block diagram of further details of the cloud computing environment of FIG. 9, in accordance with certain embodiments.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto.

Hardware and software layer 60 includes hardware and software components. Examples of hardware components include mainframes, in one example IBM ZSERIES* systems; RISC (Reduced Instruction Set Computer) architecture based servers, in one example IBM PSERIES* systems; IBM XSERIES* systems; IBM BLADECENTER* systems; storage devices; networks and networking components. Examples of software components include network application server software, in one example IBM WEBSPHERE* application server software; and database software, in one example IBM DB2* database software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and conversation thread detection 68 as shown in FIGS. 1-10.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 11:
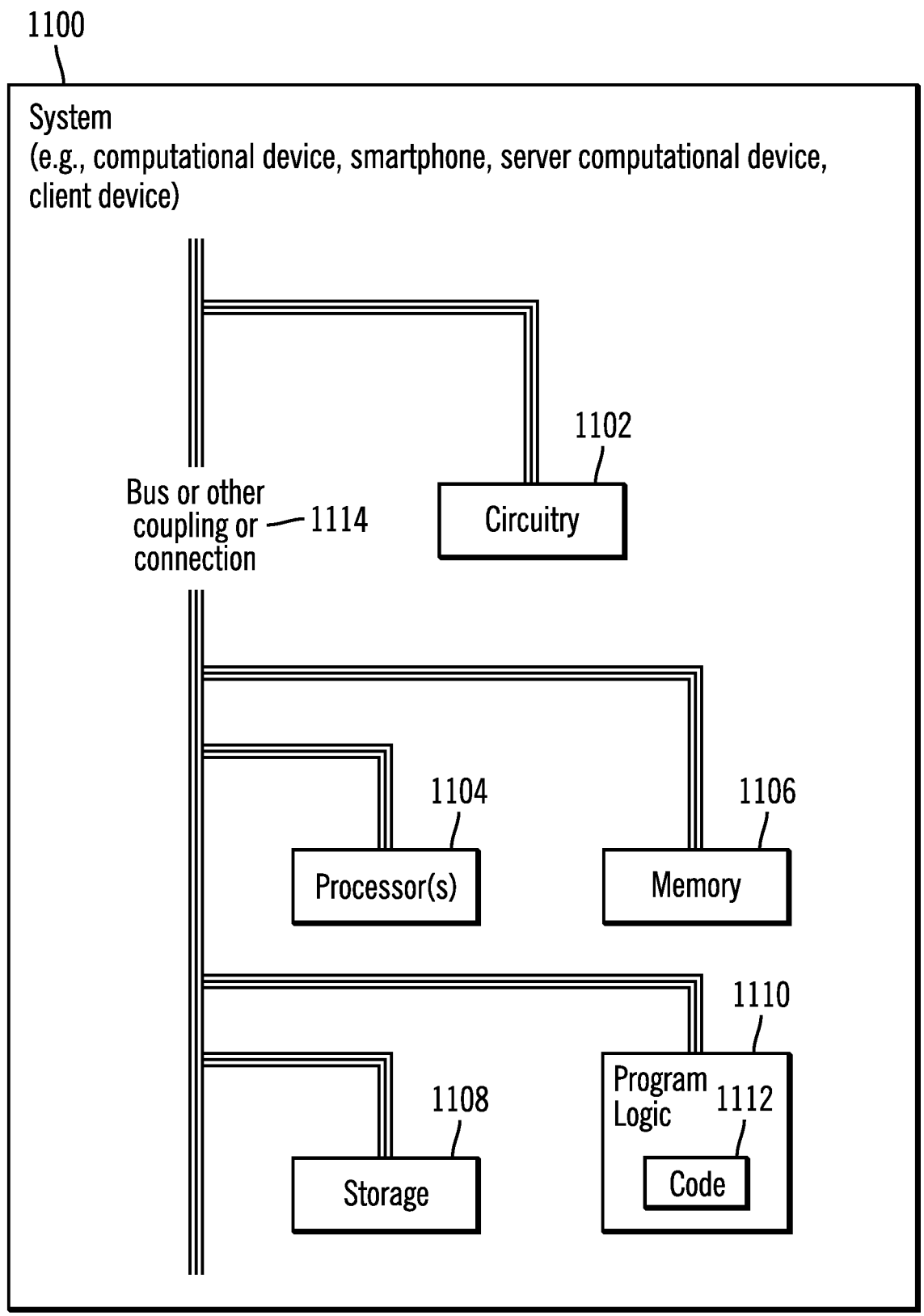
FIG. 11 illustrates a block diagram of a computational system that shows certain elements that may be included in the server computational device or the client devices, as described in FIGS. 1-10, in accordance with certain embodiments.

FIG. 11 illustrates a block diagram that shows certain elements that may be included in the server computational device 104 or client devices 108, 110 or other devices in accordance with certain embodiments. The system 1100 may include a circuitry 1102 that may in certain embodiments include at least a processor 1104. The system 1100 may also include a memory 1106 (e.g., a volatile memory device), and storage 1108. The storage 1108 may include a non-volatile memory device (e.g., EEPROM, ROM, PROM, flash, firmware, programmable logic, etc.), magnetic disk drive, optical disk drive, tape drive, etc. The storage 1108 may comprise an internal storage device, an attached storage device and/or a network accessible storage device. The system 1100 may include a program logic 1110 including code 1112 that may be loaded into the memory 1106 and executed by the processor 1104 or circuitry 1102. In certain embodiments, the program logic 1110 including code 1112 may be stored in the storage 1108. In certain other embodiments, the program logic 1110 may be implemented in the circuitry 1102. One or more of the components in the system 1100 may communicate via a bus or via other coupling or connection 1114. Therefore, while FIG. 11 shows the program logic 1110 separately from the other elements, the program logic 1110 may be implemented in the memory 1106 and/or the circuitry 1102.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
classifying, by a deep learning module implemented in a computational device, messages received from a plurality of entities into one or more conversation threads;
determining a flow fit measure for a subsequent message for potential addition to each of the one or more conversation threads;
determining a semantic match measure for the subsequent message for the potential addition to each of the one or more conversation threads; and
in response to the determining of the flow fit measure and the semantic match measure, classifying the subsequent message into a conversation thread that has a best flow fit and semantic match combination measure in comparison to other conversation threads of the one or more conversation threads, wherein the flow fit measure represents a fluency of conversation in the conversation thread if the subsequent message is added to the conversation thread.

2. The method of claim 1, wherein the semantic match measure represents a semantic closeness of conversation in the conversation thread if the subsequent message is added to the conversation thread.

3. The method of claim 1, wherein elements associated with a message includes a message identifier, an identification of a user who sent the message, and a timestamp of the message.

4. The method of claim 1, wherein the deep learning module has already classified a plurality of sequentially arriving messages into a plurality of conversation threads at a time the subsequent message arrives.

5. The method of claim 1, wherein the deep learning module determines whether to start a new conversational thread with the subsequent message, and wherein to start the new conversational thread the subsequent message is added to an empty conversation thread.

6. The method of claim 1, wherein a flow fit measure is a first conditional probability-based expression, and wherein a semantic match measure is a second conditional probability-based expression.

7. The method of claim 1, wherein potential conversation threads for adding a new message are pruned by using a greedy search mechanism in which low likelihood conversation threads for adding the new message are discarded based on computed measures that include measures for semantic closeness, measures for fluency of conversation in the conversation thread, and elapsed times of messages.

8. A system, comprising:
a memory; and
a processor coupled to the memory, wherein the processor performs operations, the operations comprising:
classifying, by a deep learning module implemented in a computational device, messages received from a plurality of entities into one or more conversation threads;
determining a flow fit measure for a subsequent message for potential addition to each of the one or more conversation threads;
determining a semantic match measure for the subsequent message for the potential addition to each of the one or more conversation threads; and
in response to the determining of the flow fit measure and the semantic match measure, classifying the subsequent message into a conversation thread that has a best flow fit and semantic match combination measure in comparison to other conversation threads of the one or more conversation threads, wherein the flow fit measure represents a fluency of conversation in the conversation thread if the subsequent message is added to the conversation thread.

9. The system of claim 8, wherein the semantic match measure represents a semantic closeness of conversation in the conversation thread if the subsequent message is added to the conversation thread.

10. The system of claim 8, wherein elements associated with a message includes a message identifier, an identification of a user who sent the message, and a timestamp of the message.

11. The system of claim 8, wherein the deep learning module has already classified a plurality of sequentially arriving messages into a plurality of conversation threads at a time the subsequent message arrives.

12. A computer program product, the computer program product comprising a computer readable storage medium having computer readable program code embodied there-with, the computer readable program code configured to perform operations on a processor, the operations comprising:

classifying, by a deep learning module implemented in a computational device, messages received from a plurality of entities into one or more conversation threads;

determining a flow fit measure for a subsequent message for potential addition to each of the one or more conversation threads;

determining a semantic match measure for the subsequent message for the potential addition to each of the one or more conversation threads; and in response to the determining of the flow fit measure and the semantic match measure, classifying the subsequent message into a conversation thread that has a best flow fit and semantic match combination measure in comparison to other conversation threads of the one or more conversation threads, wherein the flow fit measure represents a fluency of conversation in the conversation thread if the subsequent message is added to the conversation thread.

13. The computer program product of claim 12, wherein the semantic match measure represents a semantic closeness of conversation in the conversation thread if the subsequent message is added to the conversation thread.

14. The computer program product of claim 12, wherein elements associated with a message includes a message identifier, an identification of a user who sent the message, and a timestamp of the message.

\* \* \* \* \*